(12) United States Patent
Florentino et al.

(10) Patent No.: US 10,726,054 B2
(45) Date of Patent: Jul. 28, 2020

(54) EXTRACTION OF POLICIES FROM NATURAL LANGUAGE DOCUMENTS FOR PHYSICAL ACCESS CONTROL

(71) Applicant: Carrier Corporation, Palm Beach Gardens, FL (US)

(72) Inventors: Blanca Florentino, Cork (IE); Tarik Hadzic, Cork (IE); Suresh B. Veluru, Cork (IE); Ankit Tiwari, Framingham, MA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 23 days.

(21) Appl. No.: 16/078,542

(22) PCT Filed: Feb. 21, 2017

(86) PCT No.: PCT/US2017/018628
§ 371 (c)(1),
(2) Date: Aug. 21, 2018

(87) PCT Pub. No.: WO2017/147036
PCT Pub. Date: Aug. 31, 2017

(65) Prior Publication Data
US 2019/0050476 A1 Feb. 14, 2019

Related U.S. Application Data

(60) Provisional application No. 62/298,594, filed on Feb. 23, 2016.

(51) Int. Cl.
*G06F 16/31* (2019.01)
*G06Q 50/26* (2012.01)
(Continued)

(52) U.S. Cl.
CPC ............ *G06F 16/313* (2019.01); *G06F 16/34* (2019.01); *G06F 40/166* (2020.01); *G06F 40/20* (2020.01); *G06N 5/00* (2013.01); *G06Q 50/265* (2013.01)

(58) Field of Classification Search
USPC ...................................................... 704/1–504
See application file for complete search history.

(56) References Cited

U.S. PATENT DOCUMENTS 7,246,370 B2 * 7/2007 Valente ................... G06F 21/50
726/1
7,669,051 B2 * 2/2010 Redlich ............ C07K 14/70575
713/166

(Continued)

OTHER PUBLICATIONS

International Search Report and Written Opinon for application PCT/US2017/018628, dated Apr. 12, 2017, 17 pages.

(Continued)

*Primary Examiner* — Marcus T Riley
(74) *Attorney, Agent, or Firm* — Cantor Colburn LLP

(57) ABSTRACT

A system and method for generating at least one policy includes a policy document database containing at least one policy document containing at least one unstructured policy entry, and a natural language processor to analyze the at least one unstructured policy entry to generate least one formal policy, wherein a formal outcome of execution of the at least one formal policy corresponds to the at least one unstructured policy entry, and a rule processor to transform the at least one formal policy entry to generate at least one enforceable policy, wherein an enforcement outcome of execution of the at least one enforceable policy corresponds to the at least one formal policy entry.

12 Claims, 3 Drawing Sheets

(51) Int. Cl.
*G06F 40/20* (2020.01)
*G06F 40/166* (2020.01)
*G06F 16/34* (2019.01)
*G06N 5/00* (2006.01)

(56) References Cited

U.S. PATENT DOCUMENTS

| | | | |
|---|---|---|---|
| 7,769,704 | B2 | 8/2010 | Marfatia et al. |
| 7,836,080 | B2 | 11/2010 | Debie |
| 7,912,705 | B2 | 3/2011 | Wasson et al. |
| 8,056,114 | B2 * | 11/2011 | Allen ............... G06Q 10/06 726/1 |
| 8,074,256 | B2 * | 12/2011 | Valente ............ H04L 41/0266 709/223 |
| 8,115,869 | B2 | 2/2012 | Rathod et al. |
| 8,271,527 | B2 | 9/2012 | Frieder et al. |
| 8,332,350 | B2 | 12/2012 | Pulfer et al. |
| 8,380,650 | B2 | 2/2013 | Kawai et al. |
| 8,532,978 | B1 * | 9/2013 | Turner ............... G06F 40/211 704/9 |
| 9,075,796 | B2 | 7/2015 | Markatou et al. |
| 9,311,499 | B2 * | 4/2016 | Redlich ............ G06F 21/6209 |
| 2006/0242180 | A1 | 10/2006 | Graf et al. |
| 2007/0056019 | A1 * | 3/2007 | Allen ............... G06F 21/6236 726/1 |
| 2008/0209506 | A1 | 8/2008 | Ghai et al. |
| 2009/0287476 | A1 | 11/2009 | Johnson et al. |
| 2011/0314261 | A1 | 12/2011 | Brucker et al. |
| 2013/0275433 | A1 | 10/2013 | Shibata et al. |
| 2014/0163967 | A1 | 6/2014 | Aratsu et al. |
| 2014/0359691 | A1 | 12/2014 | Woods et al. |
| 2014/0379923 | A1 | 12/2014 | Oberg et al. |
| 2015/0088773 | A1 | 3/2015 | Fifield et al. |
| 2015/0106157 | A1 | 4/2015 | Chang et al. |
| 2015/0356463 | A1 | 12/2015 | Overell et al. |
| 2019/0050476 | A1 * | 2/2019 | Florentino ............ G06F 40/20 |

OTHER PUBLICATIONS

Ramanath, Rohan et al., "Unsupervised Alignment of Privacy Policies using Hidden Markov Models", Proceedings of the 52nd Annual Meeting of the Association for Computational Linguistics (Short Papers), Jun. 23-25, 2014. pp. 605-610.

Slankas, J. et al., "Access Control Policy Extraction from Unconstrained Natural Language Text", IEEE Social Com 2013, pp. 436-440.

Slankas, J. et al., "Relation Extraction for Inferring Access Control Rules from Natural Language Artifacts", Annual Computer Security Application Conference, 2014, 10 Pages.

Xiao, et al. "Automated Extraction of Security Policies from Natural-Language Software Documents"., SIGSOFT'12/FSE-20, Nov. 10-18, 2012, Cary, NC, USA; ACM, 518 pages.

* cited by examiner

EXTRACTION OF POLICIES FROM NATURAL LANGUAGE DOCUMENTS FOR PHYSICAL ACCESS CONTROL

The subject matter disclosed herein relates to extraction of rule-based policies from natural language documents, and to a system and a method for extracting rule-based policies from natural language documents for physical access control.

DESCRIPTION OF RELATED ART

Typically, physical access control systems, e.g. building access control systems, ensure that only authorized users (credential holders, cardholders) have the ability to access protected areas and under correct circumstances. For example, a physical access control system may compare a provided credential to a rule-based policy to allow or deny access to an area at a given time. Rule-based policies can effectively manage dynamic changes that affect correctness of permission records, such as changes to user properties, organizational structure, resource properties (such as sensitivity levels) etc. Transitioning to a system capable of dynamic processing requires creating rule-based policies corresponding to previously defined policies that may be described in natural language policy documents. Manually creating corresponding rule-based policies would be costly and impractical. A system and method that can generate rule-based policies from natural language documents is desired.

BRIEF SUMMARY

According to an embodiment, a system for generating at least one policy, the system includes a policy document database containing at least one policy document containing at least one unstructured policy entry, and a natural language processor to analyze the at least one unstructured policy entry to generate at least one formal policy, wherein a formal outcome of execution of the at least one formal policy corresponds to the at least one unstructured policy entry, and a rule processor to transform the at least one formal policy entry to generate at least one enforceable policy, wherein an enforcement outcome of execution of the at least one enforceable policy corresponds to the at least one formal policy entry.

In addition to one or more of the features described above, or as an alternative, further embodiments could include a security domain knowledge database containing at least one security domain knowledge entry, wherein the natural language processor utilizes the at least one security domain knowledge entry to generate the at least one formal policy or the at least one enforceable policy.

In addition to one or more of the features described above, or as an alternative, further embodiments could include that the at least one formal policy is at least one of an access control policy, a general security policy, and a security and authorization workflow policy.

In addition to one or more of the features described above, or as an alternative, further embodiments could include an interface to display the at least one formal policy or the at least one enforceable policy.

In addition to one or more of the features described above, or as an alternative, further embodiments could include that the interface receives a user input to modify the at least one formal policy or the at least one enforceable policy.

In addition to one or more of the features described above, or as an alternative, further embodiments could include that the interface receives a user confirmation for the at least one formal policy or the at least one enforceable policy.

In addition to one or more of the features described above, or as an alternative, further embodiments could include that the interface receives at least one unstructured policy query and the natural language processor analyzes the at least one unstructured policy query to identify a selected policy from the policy database, wherein the at least one unstructured policy query corresponds to the selected policy.

In addition to one or more of the features described above, or as an alternative, further embodiments could include that the at least one unstructured policy entry includes at least one unstructured workflow entry.

In addition to one or more of the features described above, or as an alternative, further embodiments could include a flowchart knowledge database containing at least one flowchart symbol knowledge entry, wherein the natural language processor utilizes the at least one flowchart domain knowledge entry to generate the at least one formal policy or the at least one enforceable policy.

In addition to one or more of the features described above, or as an alternative, further embodiments could include an access control system compatibility database containing at least one compatibility entry between a plurality of integrated system components, wherein the natural language processor utilizes the at least one compatibility entry to generate the at least one formal policy or the at least one enforceable policy.

According to an embodiment, a computer program product embodied on a tangible computer readable storage medium, the computer program product including instructions for causing a processor to execute operations including providing at least one policy document containing at least one unstructured policy entry in a policy document database, analyzing the at least one unstructured policy entry via the processor, generating at least one formal policy via the processor, wherein an outcome of execution of the at least one formal policy corresponds to the at least one unstructured policy entry, providing the at least one formal policy to a policy database, generating at least one enforceable policy via the processor, wherein an outcome of execution of the at least one enforceable policy corresponds to the at least one formal policy, and providing the at least one enforceable policy to the policy database.

In addition to one or more of the features described above, or as an alternative, further embodiments could include providing at least one security domain knowledge entry in an security domain knowledge database, and generating the at least one formal policy by utilizing the at least one security domain knowledge entry via the processor.

In addition to one or more of the features described above, or as an alternative, further embodiments could include that the at least one formal policy is at least one of an access control policy, a general security policy, and a security and authorization workflow policy.

In addition to one or more of the features described above, or as an alternative, further embodiments could include displaying the at least one formal policy or the at least one enforceable policy via an interface.

In addition to one or more of the features described above, or as an alternative, further embodiments could include modifying the at least one formal policy or the at least one enforceable policy via the interface.

In addition to one or more of the features described above, or as an alternative, further embodiments could include confirming the at least one formal policy or the at least one enforceable policy via the interface.

According to an embodiment, a system for retrieving at least one policy, the system includes an interface to receive at least one unstructured policy query, a policy database containing at least one policy, and a processor to analyze the at least one unstructured policy query to identify a selected policy from the policy database, wherein the at least one unstructured policy query corresponds to the selected policy.

In addition to one or more of the features described above, or as an alternative, further embodiments could include that the interface receives the at least unstructured policy query via a microphone.

Technical function of the embodiments described above includes a natural language processor to analyze the at least one unstructured policy entry to generate at least one formal policy, wherein a formal outcome of execution of the at least one formal policy corresponds to the at least one unstructured policy entry, and a rule processor to transform the at least one formal policy entry to generate at least one enforceable policy, wherein an enforcement outcome of execution of the at least one enforceable policy corresponds to the at least one formal policy entry.

Other aspects, features, and techniques will become more apparent from the following description taken in conjunction with the drawings.

BRIEF DESCRIPTION OF THE SEVERAL VIEWS OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the several FIGURES:

DETAILED DESCRIPTION

Figure 1:
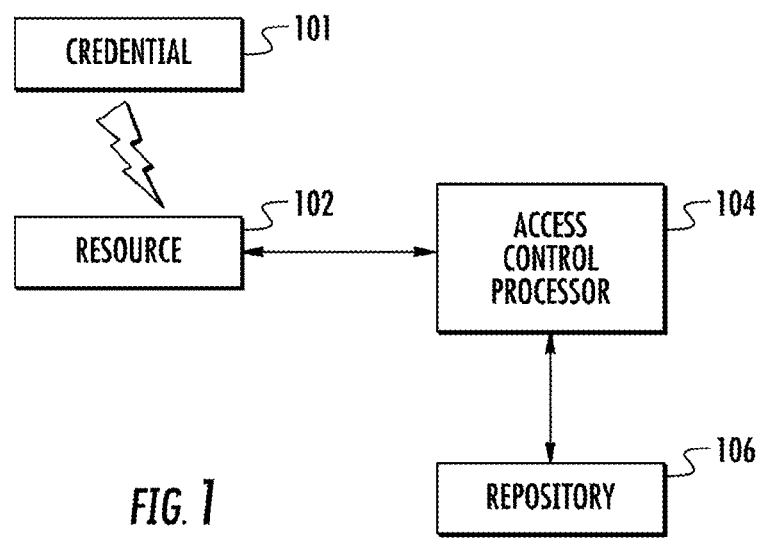
FIG. 1 is a schematic view of a physical access control system in accordance with an embodiment.

Referring now to the drawings, FIG. 1 illustrates a general schematic of an exemplary physical access control system 100 for use with the rule-based policy generation system and method in accordance with an embodiment. In an embodiment, physical access control system 100 is a physical access control system to control access to resources. Physical access control system 100 includes resource 102, access control processor 104, and repository 106.

Resource 102 of physical access control system 100 may include areas or resources that are secured by readers, locks, doors, or other physical barriers. In an exemplary embodiment, credentials 101, such as identification cards are used to interface with resource 102. In certain embodiments, the resources can be physical or logical. In certain embodiments, multiple resources 102 are grouped together in collections of resources in a certain area.

Repository 106 contains rules and policies that provide access information regarding specific users and specific resources. In an exemplary embodiment, rules and policies include information regarding circumstantial access, such as time of day. In certain embodiments, rules and policies provide, allow, or deny determination for a certain user, with corresponding credentials, for a certain resource or group of resources for a certain time of day. In certain embodiments, rules and policies can be created according to policy documents that may be written by administrators. Typically policy documents are written in unstructured natural language. Creating policies corresponding to the policy documents may be time intensive and introduce errors. Repository 106 may contain multiple databases or repositories.

Access control processor 104 may be a general-purpose processor executing operations in response to program instructions stored on a storage medium. Access control processor 104 receives inputs from resource 102 and processes inputs received and creates an allow or deny determination based on records stored in repository 106. In an exemplary embodiment, access control processor 104 provides a real time or near real time determination to allow or deny a user access based on enforceable rules or policies. The access control processor 104 may allow dynamic operation. A rule based policy generation system that interfaces with such a system allows for streamlined, automated, and more robust generation of rule-based policies corresponding to policy documents without introducing the cost of manually generating policies corresponding/explaining the policy documents.

Although a particular physical access control system is illustrated and described in the disclosed embodiment, it will be appreciated that other configurations and/or machines include other access control systems that may operate in commercial buildings, vehicles, and other applications may also benefit from embodiments disclosed.

Figure 2:
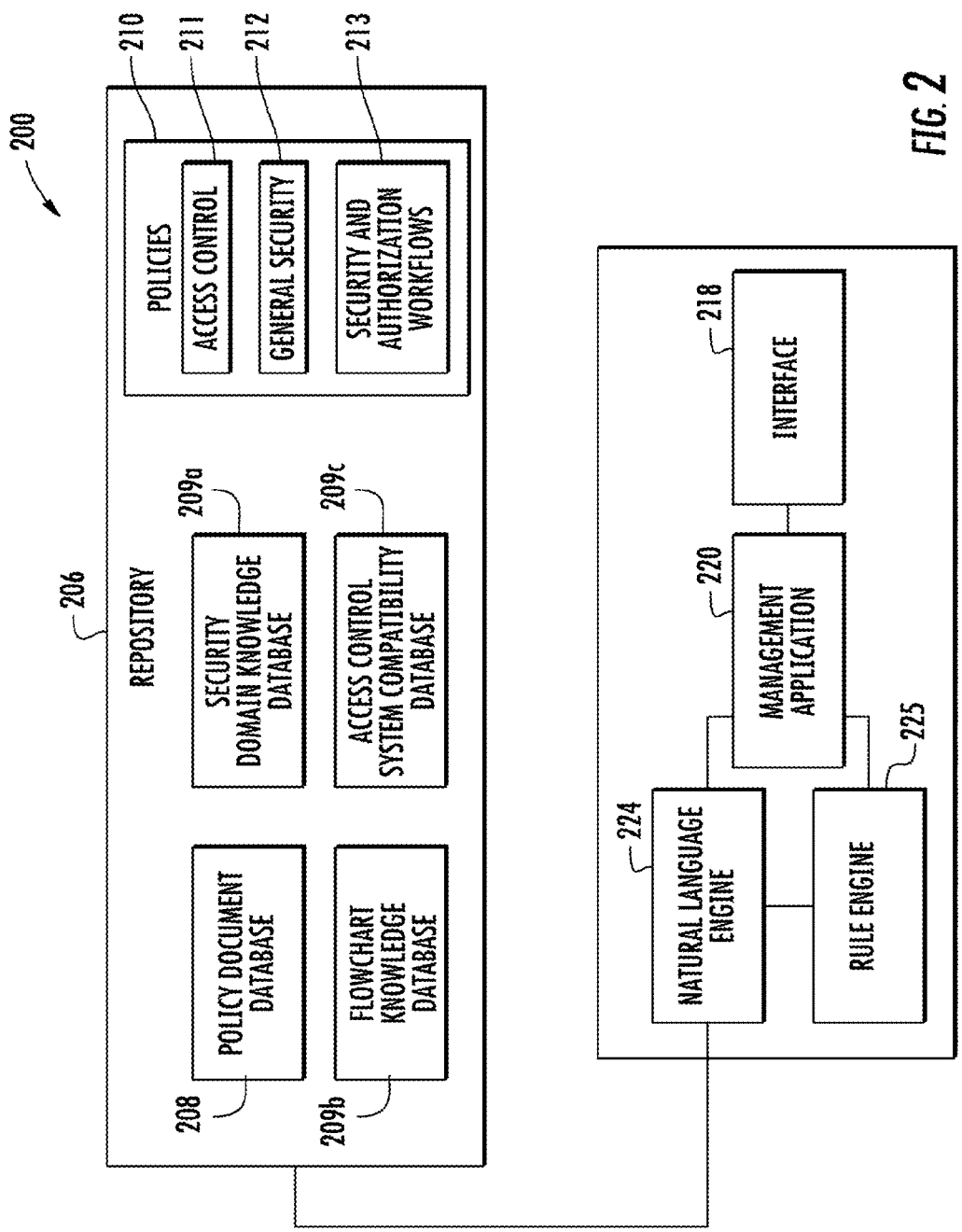
FIG. 2 illustrates a schematic view of an exemplary generation system for use with a physical access control system in accordance with an embodiment.

As illustrated in FIG. 2, rule-based generation system 200 interfaces with repository 206. In an exemplary embodiment, repository 206 is a repository of a physical access control system that utilizes rules and policies to perform an allow or deny determination with respect to a resource or a group or resources. Generation system 200 includes repository 206, management application 220, and natural language engine 224. Components of generation system 200 may be physically connected or operatively connected.

In an exemplary embodiment, repository 206 contains a policy document database 208, a security domain knowledge database 209a, a flowchart knowledge database 209b, an access control system compatibility database 209c, and a policy database 210.

In the illustrated embodiment, the policy document database 208 can store documents that include, but are not limited to access control requirements, use cases, and user manual documents. In the illustrated embodiment, the policy documents stored by the policy document database 208 can be natural language documents that do not follow syntax that is readily interpreted by access control systems, but is instead intended to be used by personnel. Such natural language documents can be used to create overall access control policies and rules. In certain embodiments, natural language policy documents can be utilized when an access control system is commissioned, to derive or update security policies, etc. In the illustrated embodiment, policy documents can contain information about workflows, badge policies, escort policies, authorization policies, etc. Policies can include statements such as "visitors should be escorted, badges must be worn at all times", "employee must have manager's approval before an access permission can be added", etc. Workflows can include bullet points or sequential statements such as "HR requests access for new employees", "Security Group must verify employee's citizenship via their passports if requested access includes Export Controlled Areas", "Access to export controlled areas should only be added after receiving additional approval from individual Area Owners," etc. In other embodiments, workflows can also be specified by flowcharts with blocks named using such natural language descriptors.

In the illustrated embodiment, the repository 206 includes a security domain knowledge database 209a. The security domain knowledge database 209a can provide security domain knowledge entries to the natural language engine 224 to parse and identify natural language policies. In the illustrated embodiment, the security domain knowledge database 209a can be specialized and enhanced by providing specialized entries for targeted subsets of security policy for use by the natural language engine 224. Security domain knowledge entries can include ontologies and taxonomies for the targeted subsets of security policy. Further, in certain embodiments, the security domain knowledge database 209a can record user modifications and confirmations of suggested policies created by the natural language engine 224 to allow user input to be considered and utilized by the natural language engine 224 for future operations.

In the illustrated embodiment, the repository 206 includes a flowchart knowledge database 209b. The flowchart knowledge database 209b can provide flowchart symbol knowledge entries to the natural language engine 224 to parse and identify workflows and other relevant natural language policies. In the illustrated embodiment, the flowchart knowledge database 209b can be specialized and enhanced by providing specialized entries for targeted subsets of workflows for use by the natural language engine 224. Workflows and flowchart symbol knowledge entries can include ontologies and taxonomies for the targeted subsets of security policy. Further, in certain embodiments, the flowchart knowledge database 209b can record user modifications and confirmations of suggested workflows created by the natural language engine 224 to allow user input to be considered and utilized by the natural language engine 224 for future operations.

In the illustrated embodiment, the repository 206 includes an access control system compatibility database 209c. The access control system compatibility database 209c can provide entries describing compatibility between two or more integrated system components to the natural language engine 224 to parse and identify natural language policies. In the illustrated embodiment, the access control system compatibility database 209c can be specialized and enhanced by providing specialized entries for targeted subsets of system components for use by the natural language engine 224. Entries can include ontologies and taxonomies for the targeted subsets of security policy. Further, in certain embodiments, the access control system compatibility database 209c can record user modifications and confirmations of suggested policies created by the natural language engine 224 to allow user input to be considered and utilized by the natural language engine 224 for future operations.

In the illustrated embodiment, the repository 206 includes a policy database 210. The policy database 210 can store policies and rules compatible with the access control system described in FIG. 1, which may be referred to as enforceable rules. In the illustrated embodiment, the policy database 210 can further receive policies created by the natural language engine 224 by interpreting and transforming the unstructured policy documents as described, which may be referred to as formal rules. In the illustrated embodiment, the policy database 210 can contain multiple types of policies stored in an access control policy database 211, a general security policy database 212, and a security and authorization workflow database 213.

In the illustrated embodiment, the access control policy database 211 can contain policies that describe who can perform a specific action over a resource. Access control policies can describe appropriate access permissions as an outcome of logical rules based on the properties of users, resources and environment, where resources refer to areas, doors, locks etc. and environment refers to time, threat level etc. For example, a policy might contain Rules 1 and 2 where Rule 1 states that users who are not US persons should not have access at any given time to areas designated as being subject to export control, while Rule 2 states that users who are members of Engineering department should have access to areas designated as research labs during weekdays from 7 am to 8 pm. In an exemplary embodiment multiple policies are stored in the access control policy database 211.

In the illustrated embodiment, the general security policy database 212 can contain general security policies that may not be formally captured by the access control system, but may be accessed or provided to building or security personnel. In the illustrated embodiment, the general security policy database 212 can contain policies such as a badge policy, an authorization policy, and other aspects of security management which usually are not captured formally in the access controls system, for example, security policies such as "visitors should be escorted" or "contractors should display their badges at all times".

In the illustrated embodiment, the security and authorization workflow database 213 can include information for access control devices or personnel to specify a sequence of activities that are necessary to complete a task.

In the illustrated embodiment, the natural language engine 224 can extract and identify policies from natural language documents and queries. In the illustrated embodiment, the natural language engine 224 can be a processor or any other suitable device. The natural language engine 224 can utilize natural language processing techniques and machine learning techniques such as mining relations, parsing sentences, and identifying semantics to extract formal access control policies from unstructured natural language policy documents. In certain embodiments, the natural language engine 224 can utilize hidden Markov models.

In the illustrated embodiment, the use of the natural language engine 224 can reduce time and effort required to extract and parse policies and representation of policies. Further, the natural language engine 224 can verify and allow for consistency between implemented policies and policies described in policy documents. The natural language engine 224 can allow for formalization and analysis of a wide range of policies, including policies that are typically not enforced by the access control system, such as general security policies stored in the general security policy database 212 and the security and authorization workflows stored in the security and authorization workflow database 213.

In certain embodiments, the natural language engine 224 can utilize the rule engine 225 can create enforceable rules or policies suitable for the target access control system, for example, if an access control system utilizes attribute based access control rules, the rule engine 225 can transform the extracted information from the natural language rule engine 224 into the proper specification. In certain embodiments, the rule engine 225 is referred to as a rule processor or an enforcement processor.

In the illustrated embodiment, the interface 218 can interact with a user to receive and provide information to the user. In conjunction with the management application 220, the interface 218 can receive natural language queries from users that can be processed by the natural language engine 224. In certain embodiments, the natural language queries can be unstructured policy queries to allow a user to find information or rules regarding policies. In certain embodiments, the policies can be created by the natural language engine 224 or the rule engine 225. In other embodiments, the policies to be searched can be created by any other suitable manner. In certain embodiments, queries can be used to search, identify, analyze, and/or filter relevant policies to provide requested policy information to users. In certain embodiments, the interface 218 can display information regarding policies and rules, such as verifying the creation of policies. In the illustrated embodiment, the interface 218 can display information such as the lexicographic representation of interpreted policies from the natural language engine 224. In certain embodiments, the interface 218 can receive queries via a microphone, keyboard, touchpad, etc. Queries can include natural language queries spoken to the interface 218.

In the illustrated embodiment, the interface 218 can be used to manage policies created by the natural language engine 224. For example, the interface 218 can be utilized to visualize created rules and policies, group relevant policy information and then reject, add, or refine information to the policies generated by the natural language engine 224. Advantageously, users can navigate the parsed information to verify the consistency of the created policies.

Figure 3:
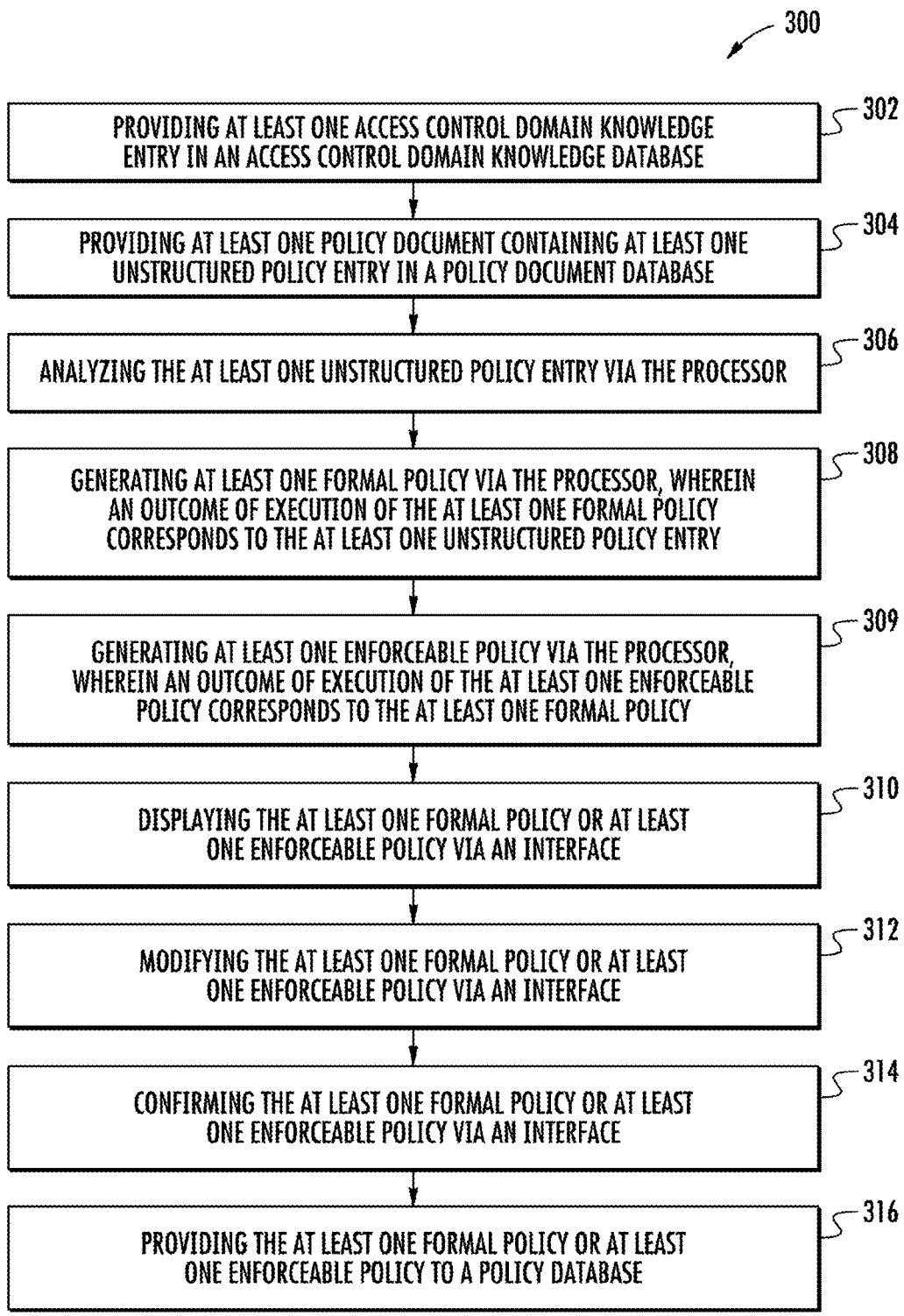
FIG. 3 is a flow diagram of a method of generating rule-based polices from unstructured documents in accordance with an embodiment.

FIG. 3 illustrates a method 300 for generating rule-based policies for a physical access control system. In operation 302, at least one security domain knowledge entry is provided in a security domain knowledge database. The security domain knowledge database can provide security domain knowledge entries to the natural language engine to parse and identify natural language policies and entries to provide relevant knowledge entries to the natural language engine. In the illustrated embodiment, the security domain knowledge database can be specialized and enhanced by providing specialized entries for targeted subsets of security policy for use by the natural language engine.

In operation 304, at least one policy document containing at least one unstructured policy entry is provided in a policy document database. In the illustrated embodiment, the policy documents stored by the policy document database can be natural language documents that do not follow syntax that is readily interpreted by access control systems, but is instead intended to be used by personnel. Such natural language documents can be used to create overall access control policies and rules. In certain embodiments, natural language policy documents can be utilized when an access control system is commissioned, to update security policies, etc.

In operation 306, the at least one unstructured policy entry is analyzed via the processor. In operation 308, at least one formal policy is generated via the processor, wherein an outcome of execution of the at least one formal policy corresponds to the at least one unstructured policy entry. In the illustrated embodiment, the natural language engine can extract and identify formal policies from natural language documents and queries. The natural language engine can utilize natural language processing techniques and machine learning techniques such as mining relations, parsing sentences, and identifying semantics to extract access control policies from natural language and otherwise unstructured policy documents. In certain embodiments, the natural language engine can utilize hidden Markov models.

In operation 309, at least one enforceable policy is generated via the processor, wherein an outcome of execution of the at least one enforceable policy corresponds to the at least one formal policy. In certain embodiments, the natural language engine can utilize the rule engine to create enforceable rules or policies suitable for the target access control system, for example, if an access control system utilizes attribute based access control rules, the rule engine can transform the extracted information from the natural language rule engine into the proper specification. In certain embodiments, the rule engine is referred to as a rule processor or an enforcement processor.

In operation 310, the at least one formal policy or the at least one enforceable policy is displayed via an interface. In operation 312, the at least one formal policy or the at least one enforceable policy is modified via the interface. In operation 314, the at least one formal policy or the at least one enforceable policy is confirmed via the interface. For example, the interface can be utilized to visualize created rules and policies, group relevant policy information and then reject, add, or refine information to the policies generated by the natural language engine. Advantageously, users can navigate the parsed information to verify the consistency of the created policies. In operation 316, the at least one formal policy or the at least one enforceable policy is provided to a policy database.

As described above, exemplary embodiments can be in the form of processor-implemented processes and devices for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope and spirit of the embodiments. Additionally, while various embodiments have been described, it is to be understood that aspects may include only some of the described embodiments. Accordingly, the embodiments are not to be seen as limited by the foregoing description, but are only limited by the scope of the appended claims.

What is claimed is:

1. A system for generating at least one policy, the system comprising:
   a policy document database containing at least one policy document containing at least one policy entry; and
   a natural language processor to analyze the at least one policy entry to generate at least one formal policy, wherein a formal outcome of execution of the at least one formal policy corresponds to the at least one policy entry; and
   a rule processor to transform the at least one policy entry to generate at least one enforceable policy, wherein an enforcement outcome of execution of the at least one enforceable policy corresponds to the at least one policy entry;
   a security domain knowledge database containing at least one security domain knowledge entry, wherein the natural language processor utilizes the at least one security domain knowledge entry to generate the at least one formal policy or the at least one enforceable policy;
   a flowchart knowledge database containing at least one flowchart symbol knowledge entry, wherein the natural language processor utilizes the at least one flowchart domain knowledge entry to generate the at least one formal policy or the at least one enforceable policy;
   an access control system compatibility database containing at least one compatibility entry between a plurality of integrated system components, wherein the natural language processor utilizes the at least one compatibility entry to generate the at least one formal policy or the at least one enforceable policy.

2. The system of claim 1, wherein the at least one formal policy is at least one of an access control policy, a general security policy, and a security and authorization workflow policy.

3. The system of claim 1, further comprising an interface to display the at least one formal policy or the at least one enforceable policy.

4. The system of claim 3, wherein the interface receives a user input to modify the at least one formal policy or the at least one enforceable policy.

5. The system of claim 3, wherein the interface receives a user confirmation for the at least one formal policy or the at least one enforceable policy.

6. The system of claim 3, wherein the interface receives at least one policy query and the natural language processor analyzes the at least one unstructured policy query to identify a selected policy from the policy document database, wherein the at least one policy query corresponds to the selected policy.

7. The system of claim 1, wherein the at least one unstructured policy entry includes at least one unstructured workflow entry.

8. A computer program product embodied on a non-transitory, tangible computer readable storage medium, the computer program product including instructions for causing a processor to execute operations comprising:
   providing at least one policy document containing at least one policy entry in a policy document database;
   analyzing the at least one policy entry via the processor;
   generating at least one formal policy via the processor, wherein an outcome of execution of the at least one formal policy corresponds to the at least one policy entry;
   providing the at least one formal policy to a policy database;
   generating at least one enforceable policy via the processor, wherein an outcome of execution of the at least one enforceable policy corresponds to the at least one formal policy; and
   providing the at least one enforceable policy to the policy database;
   providing a security domain knowledge database containing at least one security domain knowledge entry and generating the at least one formal policy by utilizing the at least one security domain knowledge entry via the processor;
   providing a flowchart knowledge database containing at least one flowchart symbol knowledge entry and generating the at least one formal policy or the at least one enforceable policy;
   providing an access control system compatibility database containing at least one compatibility entry between a plurality of integrated system components and generating the at least one formal policy or the at least one enforceable policy.

9. The method of claim 8, wherein the at least one formal policy is at least one of an access control policy, a general security policy, and a security and authorization workflow policy.

10. The method of claim 8, further comprising displaying the at least one formal policy or the at least one enforceable policy via an interface.

11. The method of claim 10, further comprising modifying the at least one formal policy or the at least one enforceable policy via the interface.

12. The method of claim 10, further comprising confirming the at least one formal policy or the at least one enforceable policy via the interface.

* * * * *